UNITED STATES PATENT OFFICE.

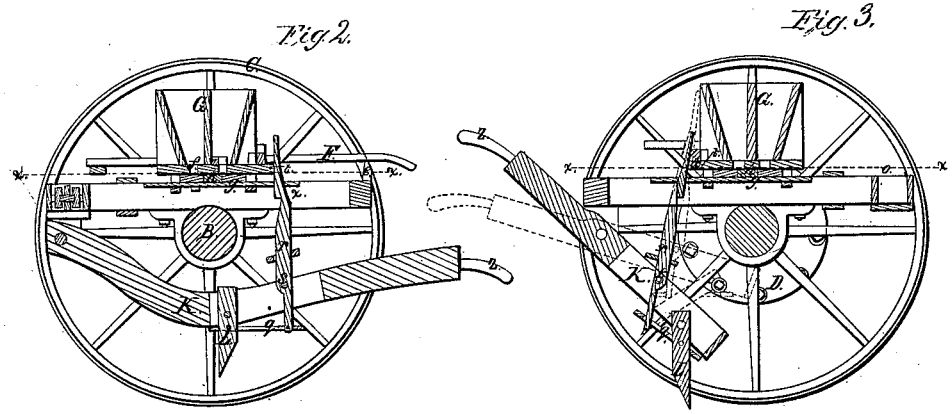
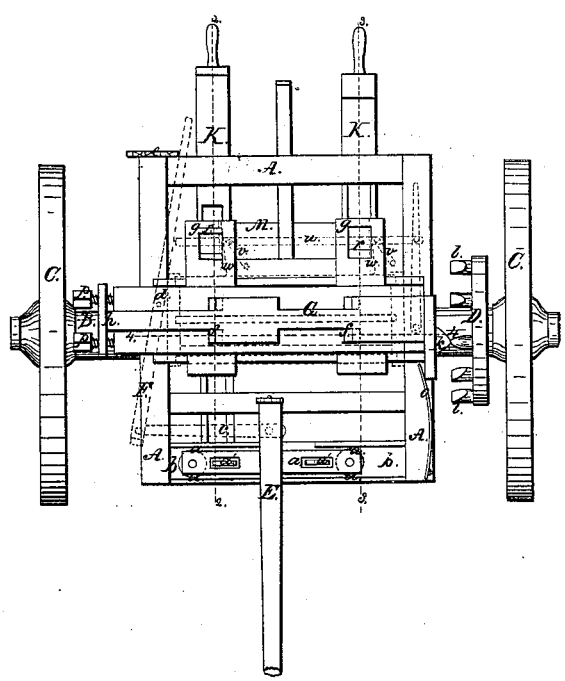
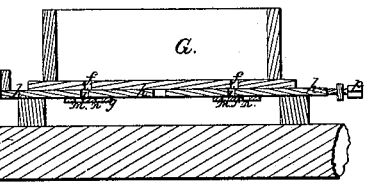
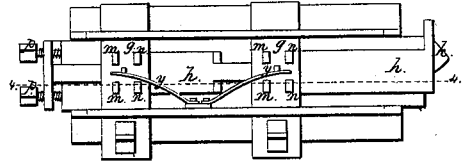

JAMES D. WILLOUGHBY, OF CHAMBERSBURG, PENNSYLVANIA.

IMPROVEMENT IN SEED-PLANTERS.

Specification forming part of Letters Patent No. 6,504, dated June 5, 1849.

*To all whom it may concern:*

Be it known that I, JAMES D. WILLOUGHBY, of Chambersburg, in the county of Franklin and State of Pennsylvania, have invented certain new and useful Improvements in Seed-Drills, of which the following is a full and exact description, reference being had to the annexed drawings of the same, making part of this specification, in which—

Figure 1 is a top view of the machine, that part above the dotted line $x\ x$ of Figs. 2 and 3 being represented in red lines. Fig. 2 is a vertical section through the line 2 2 of Fig. 1. Fig. 3 is a vertical section through the line 3 3 of Fig. 1. Fig. 4 is a vertical sectional view of the hopper and discharging apparatus, taken through the lines 4 4 of Figs. 1 and 5. Fig. 5 is a view of a detached portion of the bottom of the hopper and apparatus for discharging the seed.

The same letters indicate the same parts in all the figures.

In the accompanying drawings, A represents the frame, which supports the hopper to contain the seed, the beams, with their teeht, to make the furrows to receive the seed, and the machinery for working the same. This frame is mounted upon an axle, B, which is supported by two wheels, C. To one of the wheels a cam-wheel, D, is secured for giving motion to the slides which discharge the grain from the hopper.

E is the tongue, to which the horses that draw the machine are harnessed. The rear end of the tongue is secured to a transverse piece, $a$, which slides in a box, $b$, backward and forward across the frame. To lessen its friction rollers $a'$ are secured in either of its ends. To the end of the tongue projecting behind the transverse bars $a\ a$ a link, $c$, is hinged, connecting it to the lever F, which turns on a fulcrum, $d$, and projects behind the frame far enough to be conveniently received by the hand of the attendant of the machine, who usually walks behind it. On the rear end of the frame a series of notches, $e$, are made for the purpose of receiving and holding the rear end of the lever, which when pushed to the right moves the tongue to the left side of the machine, and when pushed to the left moves the tongue to the right side. When parallel to the side of the machine the tongue is in the middle. The moving of the tongue to one side of the frame causes the machine to incline in an opposite course, and thus a very convenient means of guiding it in any required course is furnished, whereby it is rendered much easier to keep the rows of grain either straight or parallel.

G is the hopper to contain the grain, and, being divided into two compartments, will also sow finely-divided manure at the same time. In the bottom of the hopper an aperture is made for the discharge of the grain, immediately over each tooth for making the furrows, and the discharged grain is conveyed through the shank of the tooth, which is tubular.

Between the bottom of the hopper and the adjustable slides $g$ the alternating discharger $h$ is placed, having a series of apertures, $i$, made in it, immediately beneath the apertures $f$ in the bottom of the hopper. The apertures $i$ are moved backward and forward under the holes $f$ in the hopper, from which they are filled with seed, which they discharge alternately through the apertures $m$ and $n$ in the slides. The series of cams $l$ on the wheel D successively strike the inclined plane $k$ on the projecting end of the discharger $h$ to push it in, and it is drawn out again by means of the spring $o$, and as these alternations of the slides $h$ are uniform for any given distance over which the machine passes there will be a uniform discharge of the seed at all times, unless some means of adjustment be provided; but as different kinds of seed, and the same seed under different circumstances, require to be sown in varying quantity, I have accordingly rendered the holes $i$ in the slide $h$ adjustable by making the slide in two parts by a dividing-line of the form of a series of steps, whereby whenever one is drawn back from the other a space is left open at each step, and when they are caused to approach these holes are closed. The two parts are adjusted by the screws $p$, so that the dischargers can be made larger or smaller at pleasure.

The shares or cultivating-points are attached to beams K, two modifications of which are shown, which are hinged to the frame A, either before or behind the point at which the standard of the share is attached to them. The standard of the shares L are hinged by their upper ends to the respective beams K. Immediately beneath the beam a link, $q$, is hinged to the standard which connects it to the lower end of the lever *r*, to which it is also hinged. This lever passes through the beam K, turning on a fulcrum, *s*. The upper end of this lever extends through a mortise in the bar M, by which, when necessary, it is lifted, together with the other levers, to raise the beam for the purpose of lifting the points out of the ground. The upper end of this lever *r* is provided with a catch to hook it upon the board *t*. The bar *u*, turning on the arms *v*, when alternated detaches the levers *r* when it is desired to drop down the beams and teeth. Notches are made in the upper end of one side of the levers *r*, into which the spring-detents *w* take to hold down the teeth at any required depth in the ground in order to make the furrows of the desired depth. The levers *r* have a projection, *x*, on their rear side for the purpose of drawing out the slides *g*, through which they pass whenever they are raised, so that when the tooth is withdrawn from the ground the discharge of seed will be suspended, notwithstanding the slide *h* continues to play. The slides *g*, which pass under the apertures in the hopper to close them, and thus stop the discharge of seed, are driven forward whenever they are released from the projection on the back of the levers *r* by the springs *y*, Fig. 5, so that the moment a tooth begins to make a furrow the discharge of seed also begins. When the tooth is raised up by the lever *r*, from the peculiar manner in which this lever and link *q* act upon the standard, the point is drawn back into the position represented by the red lines in Fig. 3, which will instantly detach any accumulation of roots, sods, grass, or other obstructions that may have collected thereon, and as each lever extends back far enough to be reached by the hand of the driver it is raised by the handle *z* to detach obstructions from the point and then lowered again instantly, and thus the several teeth are kept clean without arresting the progress of the machine.

Several cam-wheels D, differently arranged, may be kept on hand, so as to adapt the machine for planting seed in hills near or distant, or for other purposes.

The several parts of the machine may be constructed and arranged as herein described or in any other manner suitable to produce the same results, and it may be made in its different parts of any convenient and suitable material.

Having thus described the construction and operation of my improved seed-drill, what I claim therein as new, and desire to secure by Letters Patent, is—

1. The manner of guiding the machine by changing the position of the tongue, substantially in the manner herein set forth.

2. The combination, substantially as described, of the lever *r* and link *q* with the beam K and tooth L, for the purpose of drawing back the point of the tooth at the same time the beam is raised, whereby the tooth is easily kept clear of sods, roots, and other obstructions, and the danger of its getting broken diminished.

In testimony whereof I have hereunto signed my name this 7th day of March, A. D. 1849.

J. D. WILLOUGHBY.

Witnesses:
S. W. WOOD,
P. H. WATSON.